United States Patent [19]

Emori et al.

[11] Patent Number: 5,025,323
[45] Date of Patent: Jun. 18, 1991

[54] DEVEOLOPING UNIT SWITCHING DEVICE FOR A PRINTER

[75] Inventors: Kiyoshi Emori; Hiroshi Maekawa, both of Osaka, Japan

[73] Assignee: Minolta Camera Kabushiki Kaisha, Osaka, Japan

[21] Appl. No.: 299,648

[22] Filed: Jan. 23, 1989

[30] Foreign Application Priority Data

Jan. 22, 1988 [JP] Japan ................................. 63-13396

[51] Int. Cl.⁵ ...................... H04N 1/29; G03G 15/01; G03G 15/06
[52] U.S. Cl. .................................... 358/300; 355/245; 355/328
[58] Field of Search ............... 355/202, 204, 208, 210, 355/326, 328, 245; 358/300, 75, 401

[56] References Cited

U.S. PATENT DOCUMENTS

| 3,917,396 | 11/1975 | Donohue et al. | |
|---|---|---|---|
| 4,260,242 | 4/1981 | Nishikawa | 355/210 |
| 4,733,269 | 3/1988 | Kasahara et al. | 355/326 |
| 4,777,510 | 11/1988 | Russel | 355/328 |
| 4,885,611 | 12/1989 | Higashio et al. | 355/245 |

FOREIGN PATENT DOCUMENTS 61-203474  9/1986  Japan .

Primary Examiner—R. L. Moses
Attorney, Agent, or Firm—Burns, Doane, Swecker & Mathis

[57] ABSTRACT

An improved developing unit switching device for a printer capable of providing a multicolor copy from one formation of latent electrostatic images comprises a photoreceptor drum on which the latent electrostatic images are formed; a rotary encoder for detecting an amount of rotation of the photoreceptor drum; developing units containing toner of at least two colors for providing multicolor copies; and a switching apparatus for switching the respective developing units. The improved device switches respective developing units in response to an output signal from the rotary encoder.

11 Claims, 17 Drawing Sheets

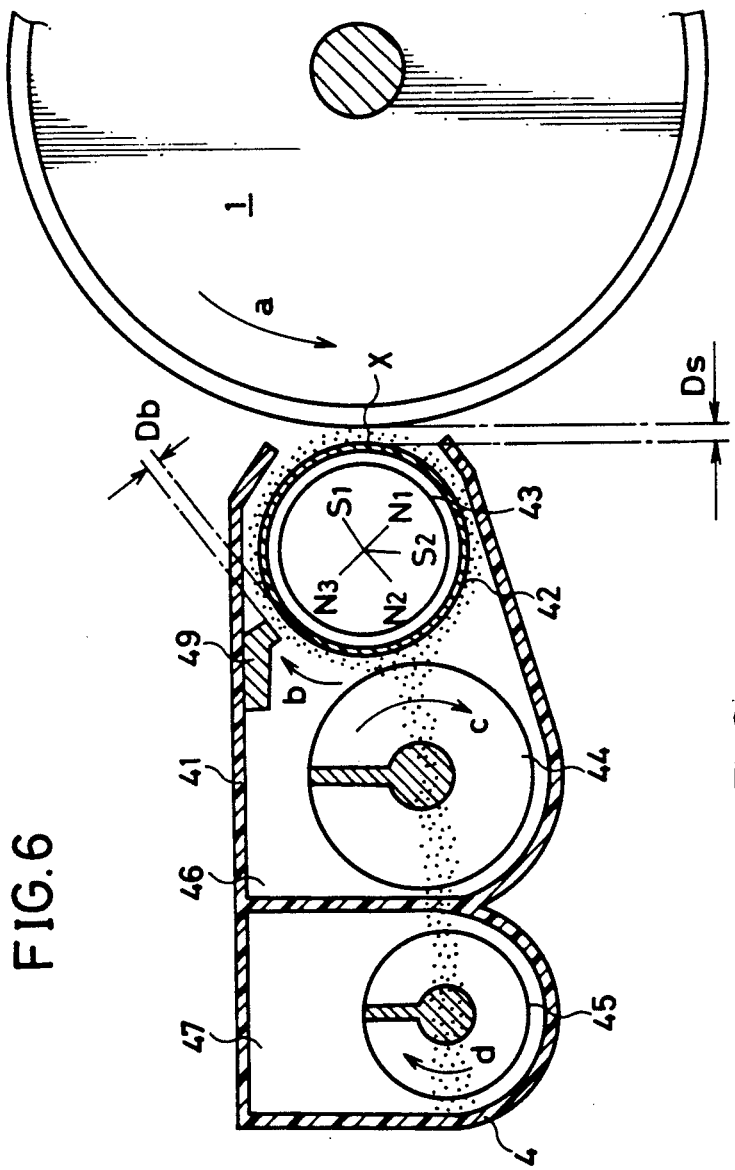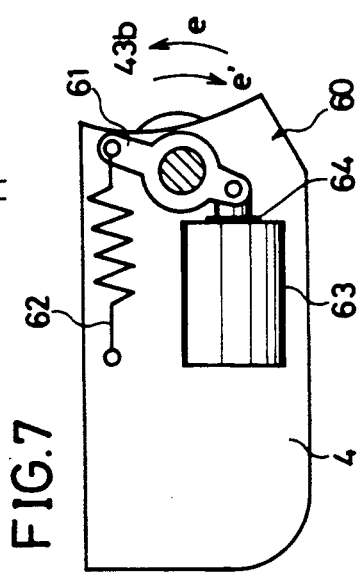
FIG.6
FIG.7

(a) DISTANCE FROM PAPER EDGE (b) LINE NUMBER FROM PAPER EDGE (c) RASTER NUMBER FROM PAPER EDGE

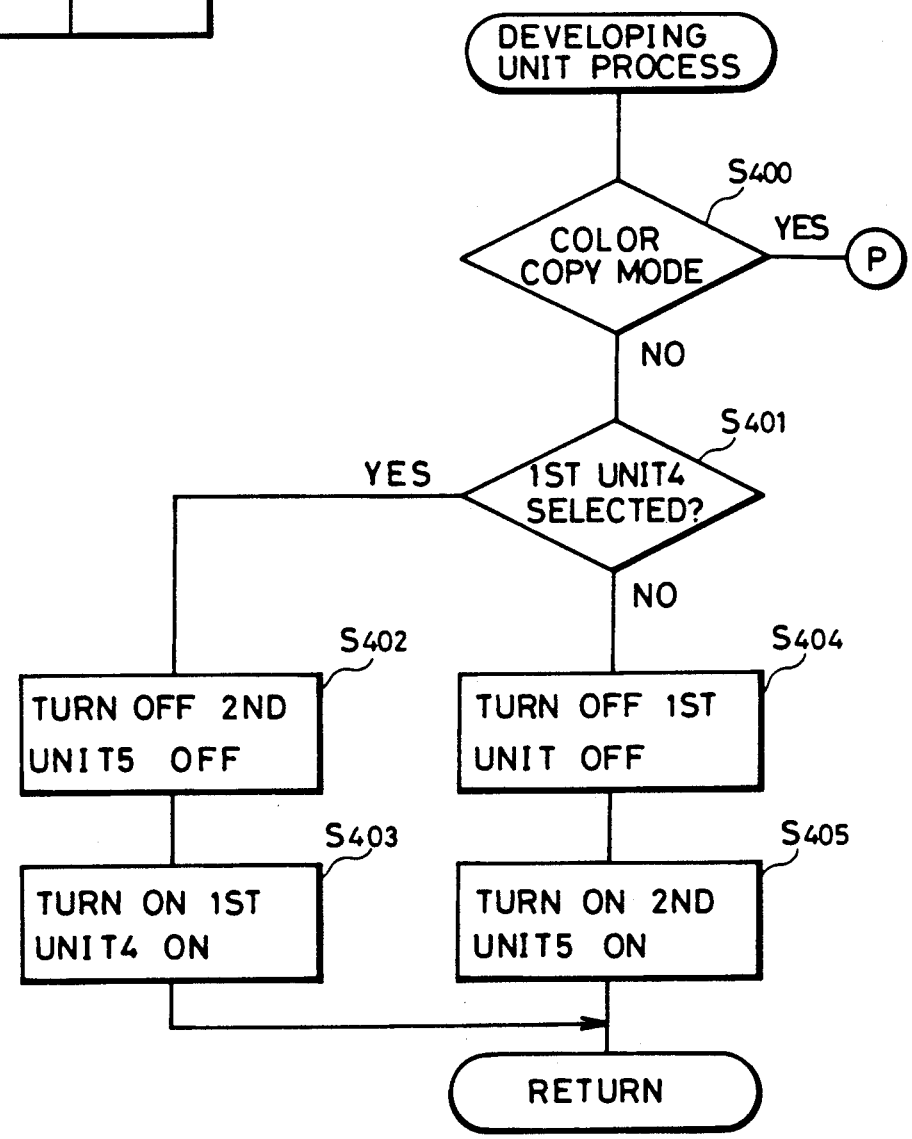

# DEVEOLOPING UNIT SWITCHING DEVICE FOR A PRINTER

BACKGROUND OF THE INVENTION

1. Field of The Invention

The present invention relates to a developing unit switching device for a printer on which attached are a plurality of developing units containing developers of different colors and, more specifically, to an improvement of the developing unit switching device.

2. Description of The Related Art

The applicant of the present invention has developed and filed a patent application of a multicolor printer connected to a host machine such as a word processor, a personal computer for business use and the like for printing various data such as characters, drawings, images as hard copies, which is capable of simultaneous multicolor printing on 1 page by selectively switching and driving a plurality of developing units containing developers of different colors.

Generally, an exposure position on the photoreceptor drum is different from a developing position where toner is applied on latent electrostatic images formed on the photoreceptor drum. Therefore, in a series of processes from exposure to development, there is inevitably a time lapse. Therefore, the switching between the plurality of developing units can be controlled by measuring the lapse of time by means of a timer or the like.

However, the above described control of the switching timing by means of the timer and the like has the following disadvantages. Namely, when the speed of processing such as exposure, development, and fixing is changed, for example the speed is increased, the time constant set in the timer for measuring the lapse of time must be changed. If the speed of rotation of the photoreceptor drum happens to be changed during the series of processes due to a mechanical or electrical cause, the predetermined position for switching the developer does not exactly coincide with the actual position of switching.

SUMMARY OF THE INVENTION

Therefore, one object of the present invention is to control operation of a plurality of developing units employed in a printer capable of providing a multicolor copy from one formation of latent electrostatic images without using a timer.

Another object of the present invention is to switch the developing units independent of the speed of the printing process in a printer capable of providing a multicolor copy from one formation of latent electrostatic images.

A further object of the present invention is to control the position of switching developing units with high precision in a printer capable of providing multicolor copies from one formation of latent electrostatic images.

The above described objects of the present invention can be attained by a printer of the present invention, comprising: a photoreceptor drum; latent electrostatic image forming apparatus provided opposed to the photoreceptor drum for forming a latent electrostatic image on an outer periphery of the photoreceptor drum; first developing unit provided opposed to the photoreceptor drum in the downstream side of the latent electrostatic image forming apparatus for developing a portion of the latent electrostatic image with toner of a first color; second developing unit provided in the downstream side of the first developing unit for developing another portion of the latent electrostatic image with toner of a second color which is different from said first color; pulse generating apparatus associated with said photoreceptor drum for generating pulses corresponding to an amount of rotation of the photoreceptor drum; counting apparatus connected to the pulse generating apparatus for counting the pulses, the counting apparatus adapted to start counting after start of formation of the latent electrostatic image; switching signal generating apparatus for generating a signal for switching operation of the first and second developing units, said switching signal generating apparatus adapted to output the switching signal when a value counted by the counting apparatus reaches a prescribed value; and control apparatus responsive to the switching signal for controlling the operation of the first and second developing units.

Since the printer of the present invention comprises the above described components, two developing units containing toner of different colors are respectively operated in response to an output signal from the pulse generating apparatus for detecting the amount of rotation of the photoreceptor drum. Consequently, the operation of the two developing units of the printer can be controlled without using a timer.

According to a preferred embodiment of the present invention, the switching signal generating apparatus generates a first signal for stopping the operation of the first developing unit and a second signal for operating the second developing unit.

Since the printer of the present invention comprises the above described component, the operation of the two developing units containing toners of different colors can be switched in response to the output signals of the pulse generating apparatus for detecting the amount of rotation of the photoreceptor drum. Since the printing apparatus is controlled by the rotation of the photoreceptor drum, the switching of the developing units of the printer can be carried out independent from the speed of the printing process.

According to a more preferred embodiment of the present invention, the photoreceptor drum is driven by a servo motor, and the pulse generating apparatus comprises an encoder fixed on an output axis of the servo motor.

Since the printer of the present invention comprises the above described component, the operation of the developing units containing toner of different colors can be switched in response to an output pulse of the encoder fixed on the output axis of the servo motor controlling the rotation of the photoreceptor drum. The position of rotation of the photoreceptor drum is surely controlled with high precision by means of the servo motor. Therefore, the position of switching the developing units in the printer can be surely controlled with high precision.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2 to 7 illustrate the structure and switching of the developing units;

DESCRIPTION OF THE PREFERRED EMBODIMENTS

The present invention is applied to a printer capable of providing an image of two colors simultaneously (hereinafter referred to as simultaneous color printing) by switching developing units on 1 page to be printed. Therefore, one embodiment of the present invention applied to such a printer will be described in the following with reference to the figures.

Figure 1:
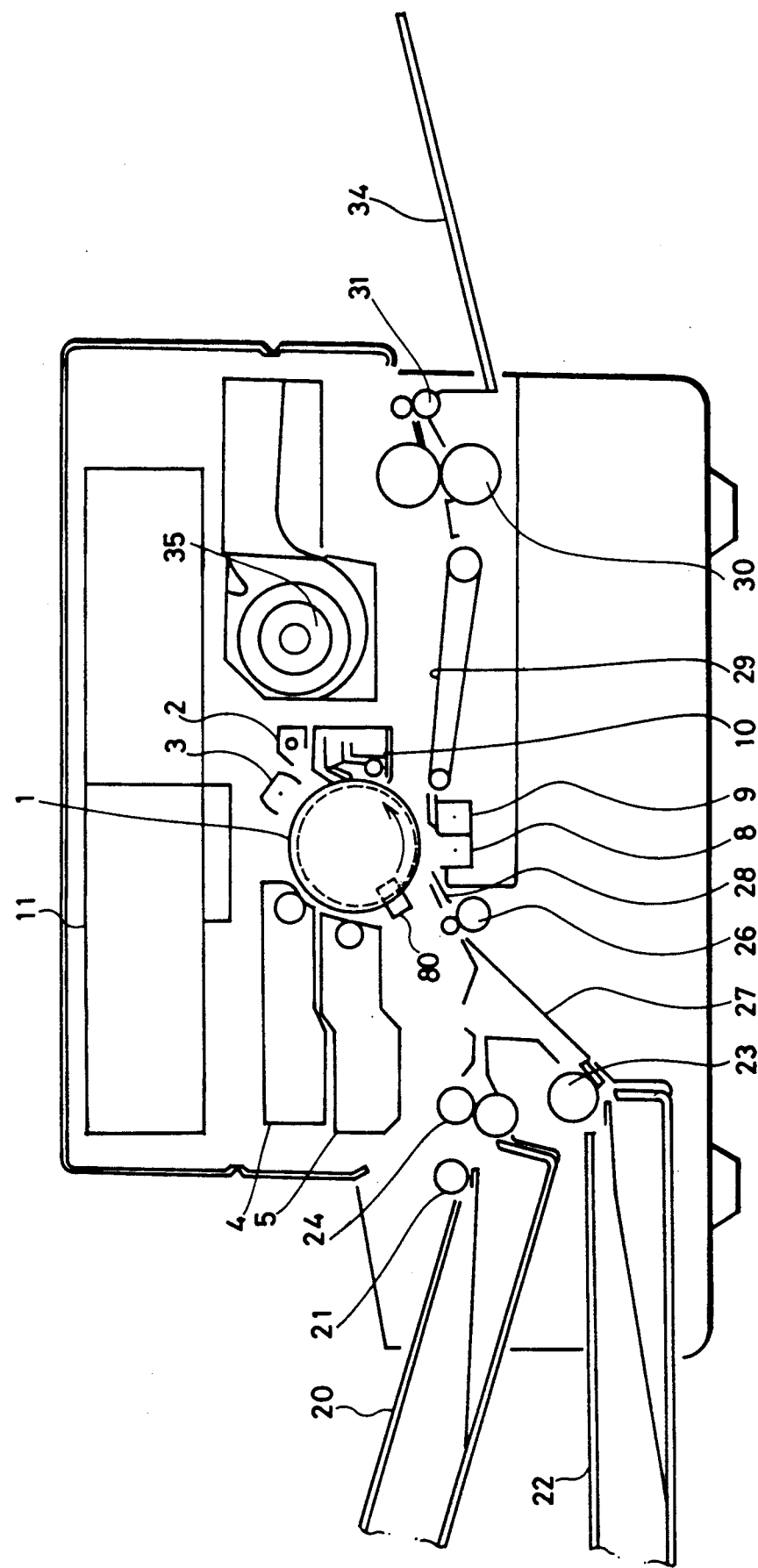
FIG. 1 is a schematic cross sectional view of a printer.

FIG. 1 is a schematic cross sectional view showing a structure of a printer on which the apparatus of the present invention is applied.

A photoreceptor drum 1 which can be rotary driven counterclockwise is arranged approximately at the center of a printer body. Around the photoreceptor drum 1 successively arranged are a main eraser lamp 2, a corona charger 3, a first developing unit 4, a second developing unit 5, a transfer charger 8, a charger 9 for separating copy papers, a blade type cleaning apparatus 10 and so on. The photoreceptor drum 1 comprises a photosensitive layer provided on the surface thereof. The photoreceptor drum is irradiated by the eraser lamp 2 at every rotation, charged by the corona charger 3 when it passes through the charger 3, and images corresponding to image data are exposed by the turning ON/OFF of a laser beam emitted from a laser unit portion 11.

Meanwhile, upper and lower paper feed inlets respectively having paper feed rollers 21 and 23 are provided on the left side of the printer body, on which are attached an upper paper feed cassette 20 and a lower paper feed cassette 22. The recording papers contained in the respective paper feed cassette 20 and 22 are conveyed through a roller pair 24, a timing roller pair 26, a guide plate 27, a guide plate 28 directly before the transfer position, a conveyer belt 29, a fixing apparatus 30 and a discharging roller 31.

Images corresponding to the image data provided by the host machine are exposed on the photoreceptor drum 1 in accordance with the ON/OFF state of the laser beam. Consequently, latent electrostatic images of the images are formed on the photoreceptor drum. The first and second developing units 4 and 5 are selectively driven, whereby toner contained in the first and second developing units 4 and 5 are selectively applied onto the latent electrostatic images.

Consequently, the toner images on the photoreceptor drum 1 are transferred by the transfer charger 8 onto a paper which was fed from the timing roller pair 26 with the end portion thereof aligned with the toner image forming region. Thereafter, the paper on which the toner images are transferred is separated from the surface of the photoreceptor drum 1 by means of the separating charger 9 to be transmitted to the fixing apparatus 30 through the conveyer belt 29. The toner images are heat fixed in the fixing apparatus 30. Thereafter, the paper is fed to the discharging tray 34 by means of the discharging roller pair 31. The printer comprises an exhaust fan 35 for exhausting the air heated to a high temperature by the heat generated in the printer. The photoreceptor drum 1, the paper feeding rollers 21 and 23, the roller pair 24, the timing roller pair 26, the first and second developing units 4 and 5, the conveyer belt 29, the fixing apparatus 30, the discharging roller pair 31 and so on are driven by a main motor, not shown. In order to enable independent operation, the paper feeding rollers 21 and 23, the timing roller pair 26, the roller pair 24, the first and second developing units 4 and 5 and so on are adapted such that the transmission/no-transmission of the driving power of the main motor can be switched by means of a solenoid, an electromagnetic spring clutch or the like (not shown). The amount of rotation of the photoreceptor drum 1 is detected by a photoreceptor drum rotation detecting encoder 80.

FIGS. 2 to 7 illustrate the structure and the mechanism of switching of the developing units employed in the apparatus in accordance with one embodiment of the present invention.

Figure 2:
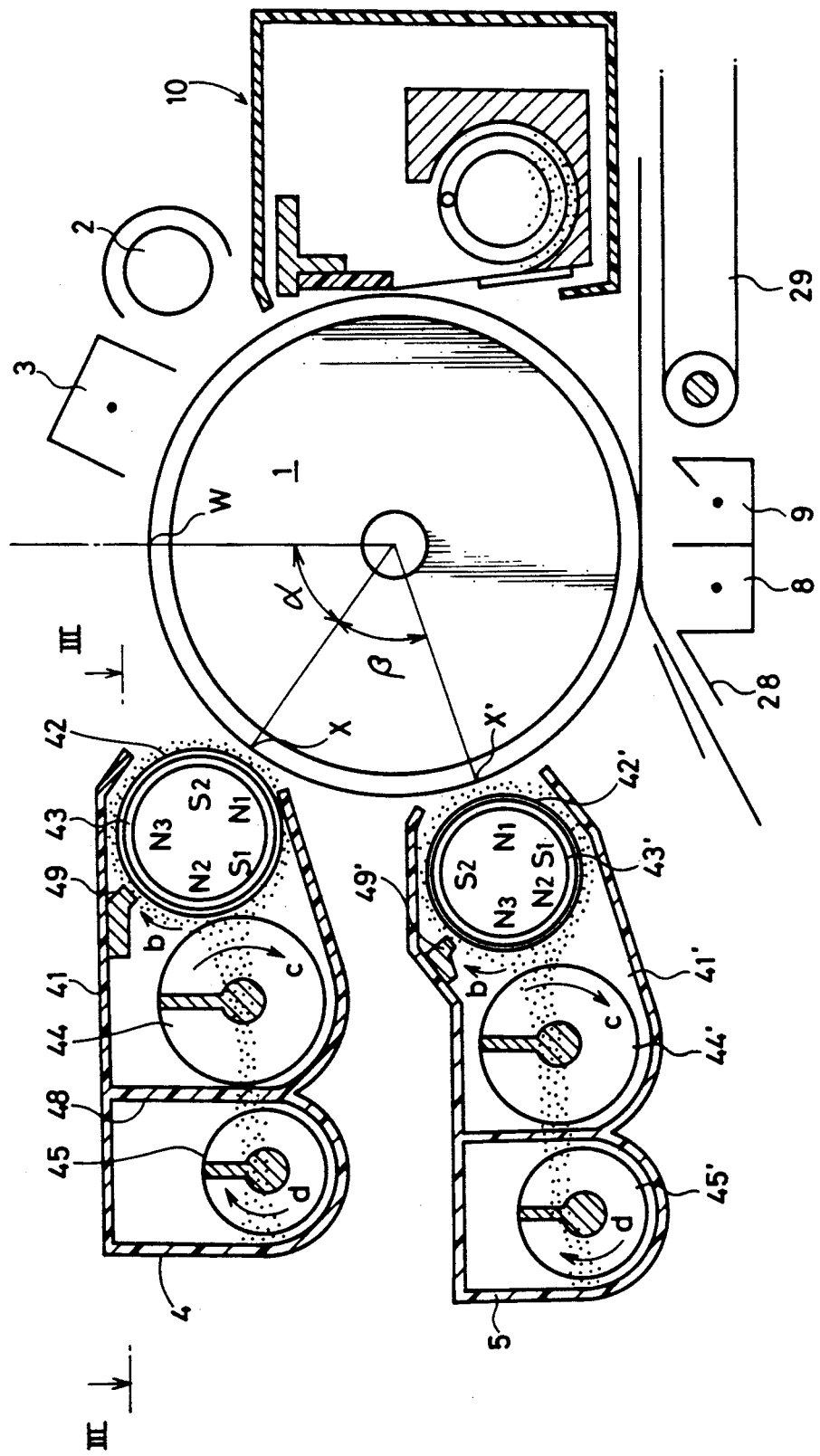

The developing units 4 and 5 have approximately the same structure as shown in FIG. 2. A developer tank 41, a developing sleeve 42, a supply roller 44 and a screw 45 are arranged in this order from the side of the photoreceptor drum 1 to apply the toner onto the photoreceptor drum.

The developing sleeve 42 is a cylinder ($\phi$ 24.5 mm) formed of a non-magnetic conductive material whose outer surface made rough by sandblasting. A developing gap; $Ds(=0.6$ mm) (see FIG. 4), is provided between the photoreceptor drum 1 and the developing sleeve 42. The developing sleeves 42 and 42' are opposed to the developing positions X and X' on the photoreceptor drum 1, and the angles of rotation from the exposure point W to the developing positions X and X' are selected to be $\alpha$ and $\alpha + \beta$, respectively.

On the rear side of the portion opposing to the developing position X of the developing sleeve 42, there is provided a magnetic brush height regulating member 49 formed on the upper portion of the inner surface of the developer trunk 41. A brush height regulating gap; $Db$ ($=0.4$ mm) (see FIG. 4), is provided between the magnetic brush height regulating member 49 and the developing sleeve 42.

The developing sleeve 42 comprise a magnet roller 43 in which a plurality of magnets are arranged along the axial direction. The magnetic force of the magnetic poles $N_1$ to $N_3$, $S_1$ and $S_2$ positioned on the outer prephery of the magnets are $N_1 = 1000G$, $N_2$, $N_3 = 500G$, and G, and $S_1$, $S_2 = 800G$ (G is an abbreviation of gauss), respectively.

Figure 4:
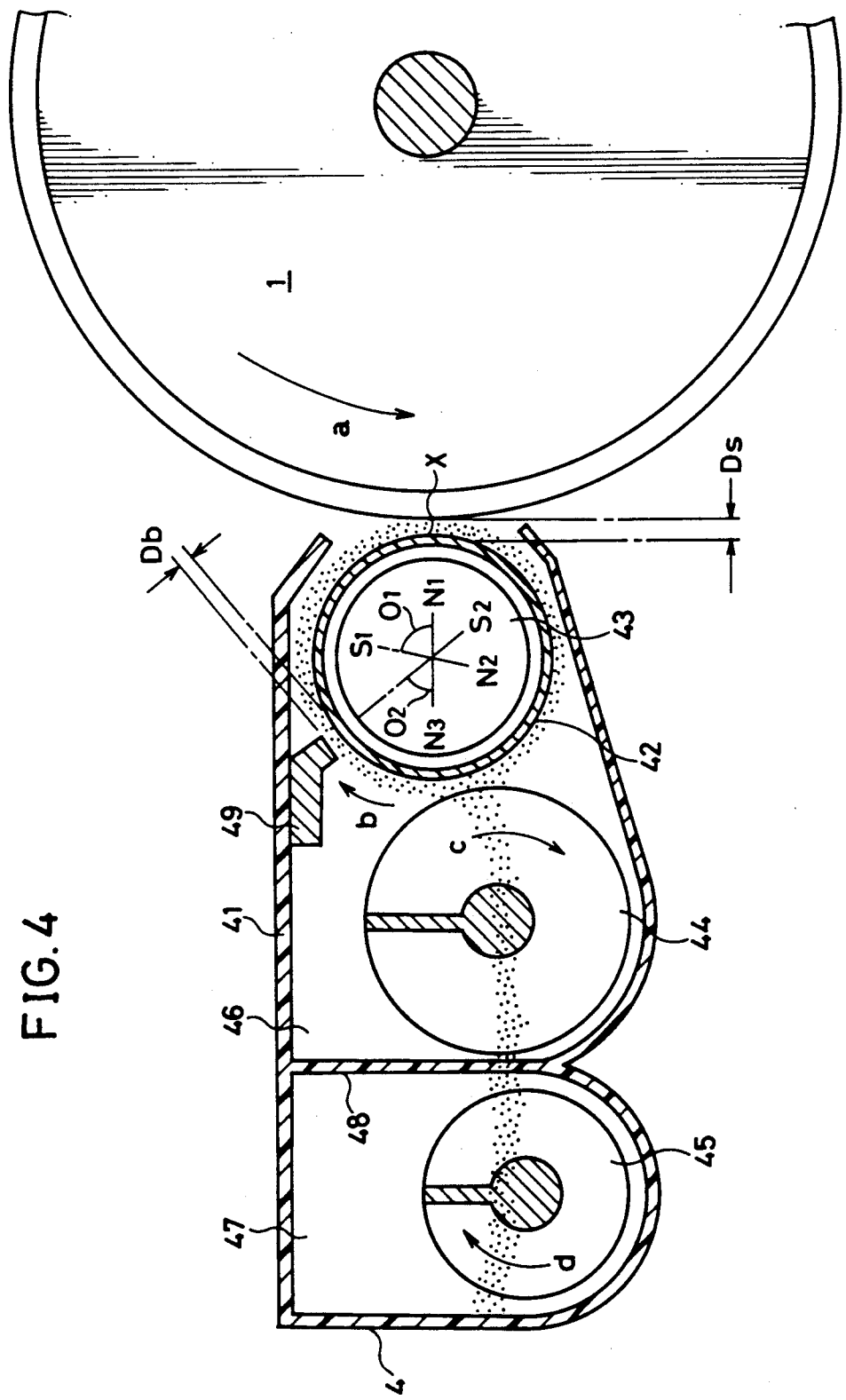

The center of the magnetic pole $N_1$ is placed at a position which is spaced apart from the center of the magnetic pole $S_1$ by $\theta_1$ (80°) in the clockwise direction, and the center of the magnetic pole $N_3$ is placed at a position which is spaced apart from the portion opposing the brush height regulating member 49 by $\theta_2$(40°) in the counterclockwise direction with the magnetic pole $N_1$ opposing to the photoreceptor drum 1, as shown in FIG. 4.

Figure 3:
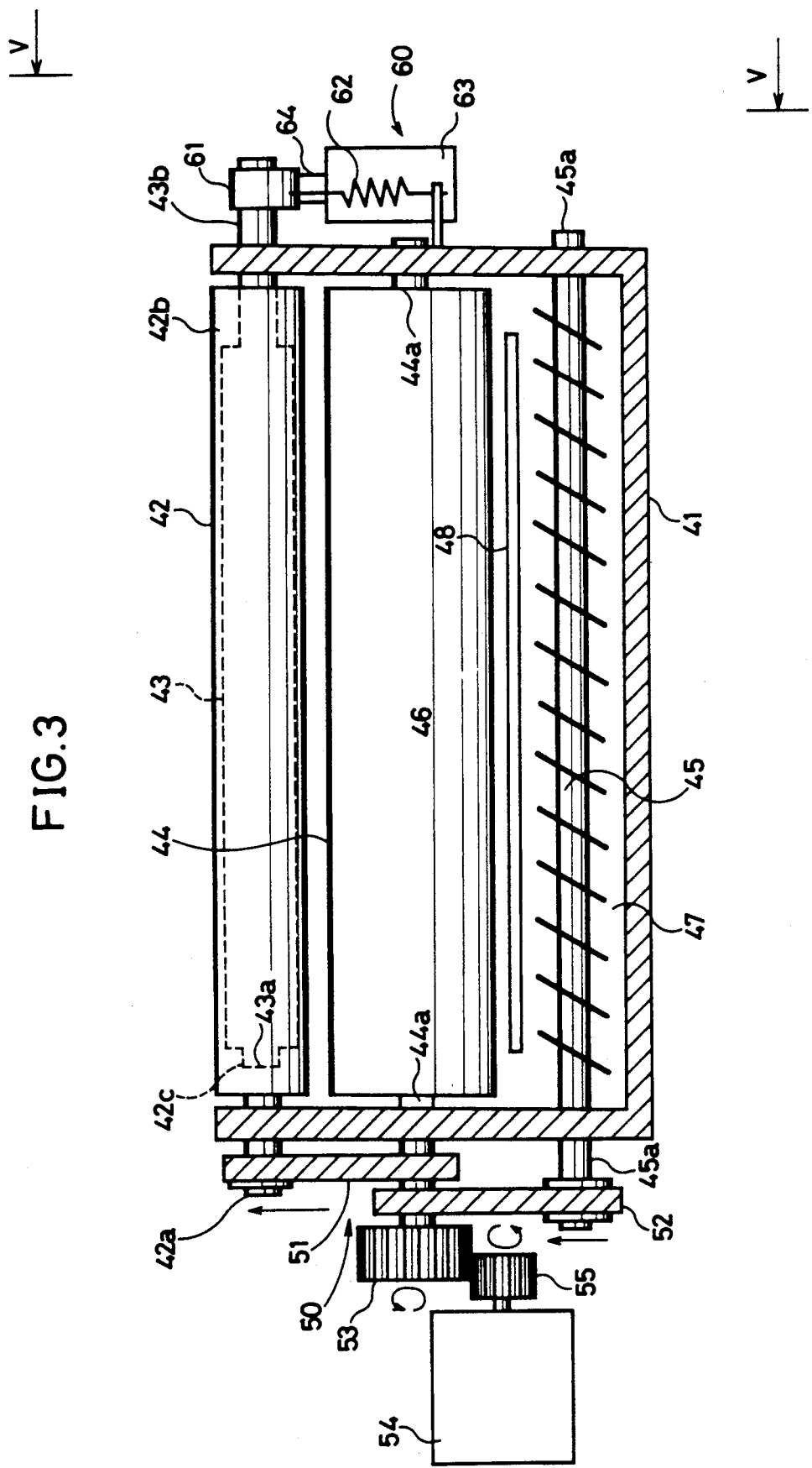

FIG. 3 is cross section taken from the line III—III of FIG. 2. Referring to FIG. 3, a support axis of the magnet roller 43 has its one end portion 43a supported by a concave portion 42c of a bearing provided in the developing sleeve 42 and the other end portion 43b supported by a side wall of the developing tank 41. The magnet roller can be turned by a prescribed angle ($\theta = 40°$) by a moving means 60 which will be described in detail in the following.

Meanwhile, the developing sleeve 42 has its bearing portion 42b in the right side as viewed in FIG. 3 supported by a support axis 43b of the magnet roller 43 and its support axis 42a on the opposite side supported by the side wall of the developing tank 41. The developing sleeve 42 can be rotary driven by a driving means 50.

The supply roller 44 and the screw 45 are respectively provided in conveying paths 46 and 47 which are separated from each other by a partition 48. The rollers 44 and 45 have their support axes 44a and 45a supported by the side walls of the developing tank 41 and the rollers are driven by the driving means 50.

The conveyer paths 46 and 47 communicate with each other on both sides of the developing tank 41 as shown in FIG. 3 so that the toner is well mixed in the developer tank 41.

The driving means 50 for driving the developing units 4 and 5, the supply roller 44 and the screw 45 will be described in the following.

As shown in FIG. 3, a belt 51 is wound around the support axis 42a of the developing sleeve 42 and the support axis 44a of the supply roller 44. A belt 52 is wound around the support axis 44a of the supply roller 44 and the support axis 45a of the screw 45.

A gear 53 is attached to an end portion of the support axis 44a of the supply roller 44, which gear 53 is engaged with a driving gear 55 of a motor 54.

Therefore, when the driving gear 55 is rotated in the direction of the solid line in FIG. 3 by driving the motor 54, the gear 53 and the belt 51 and 52 are driven in the direction of the solid line, respectively. Consequently, the developing sleeve 42, the supply roller 44 and the screw 45 are rotated in the direction of the arrows b, c and d, respectively as shown in FIGS. 2 and 4. The developing sleeve 42 is adapted to rotate at a speed of 240 rpm.

Figure 5:
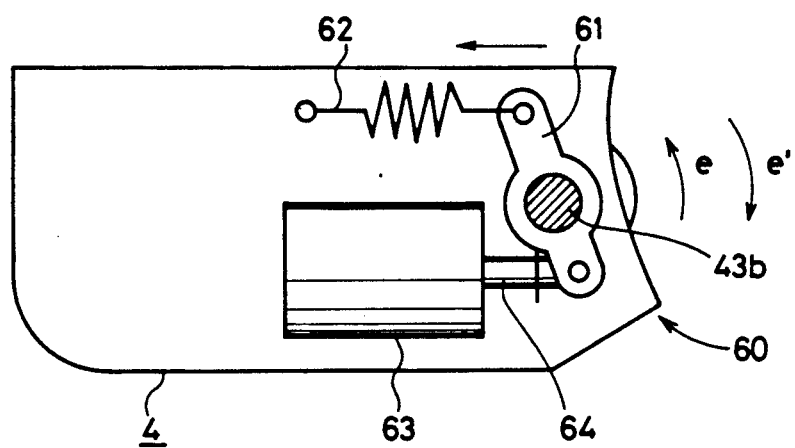

FIGS. 5 and 7 are side views taken from the line V—V of FIG. 3. Referring to FIGS. 5 and 7, an apparatus 60 for moving the magnet roller 43 comprises a lever 61, a spring 62 and a solenoid 63. The lever 61 is fixed to an end portion of the support axis 43b of the magnet roller 43. One end of the spring 62 which is fixed on the developer tank 41 is attached to one end portion of the lever 61, so that the lever is always forced in the direction of the arrow e. A plunger 64 of the solenoid 63 is engaged with the other end portion of the lever 61, so that the lever 61 is rotated in the direction of the arrow e' against the forcing power of the spring 62 when the solenoid 63 is driven.

When the solenoid 63 is not operated, namely, when the lever 61 is in the state shown in FIG. 5, the magnetic pole $N_1$ of the magnet roller 43 is opposed to the photoreceptor drum 1, and the magnetic pole $N_3$ is displaced to a position spaced by $\theta_2$(40°) in the counterclockwise direction from the portion opposing to the magnetic brush height regulating member 49 as shown in FIG. 4.

On the contrary, when the solenoid 63 is driven and the lever 61 is in the state shown in FIG. 7, the magnetic pole $N_3$ is opposed to the magnetic brush height regulating member 49 and a portion between the magnetic pole $N_1$ and the magnetic pole $S_1$ is opposed to the photoreceptor drum 1, as shown in FIG. 6.

The toner is applied to the photoreceptor drum 1 from the developing unit 5 in the state shown in FIG. 4, while the toner is not supplied to the photoreceptor drum from the developer unit 5 in the state shown in FIG. 6. Namely, in the state of FIG. 6, an intermediate portion between the N and S magnetic poles is opposed to the photoreceptor drum 1, that is, a portion of the developing sleeve 42 on which there is no toner is opposed to the photoreceptor drum 1.

By attaching a plurality of developing units having the above described structure and by switching the driving of the same corresponding to the prescribed image forming regions, toner of different colors can be applied to different image forming regions.

Figure 8:
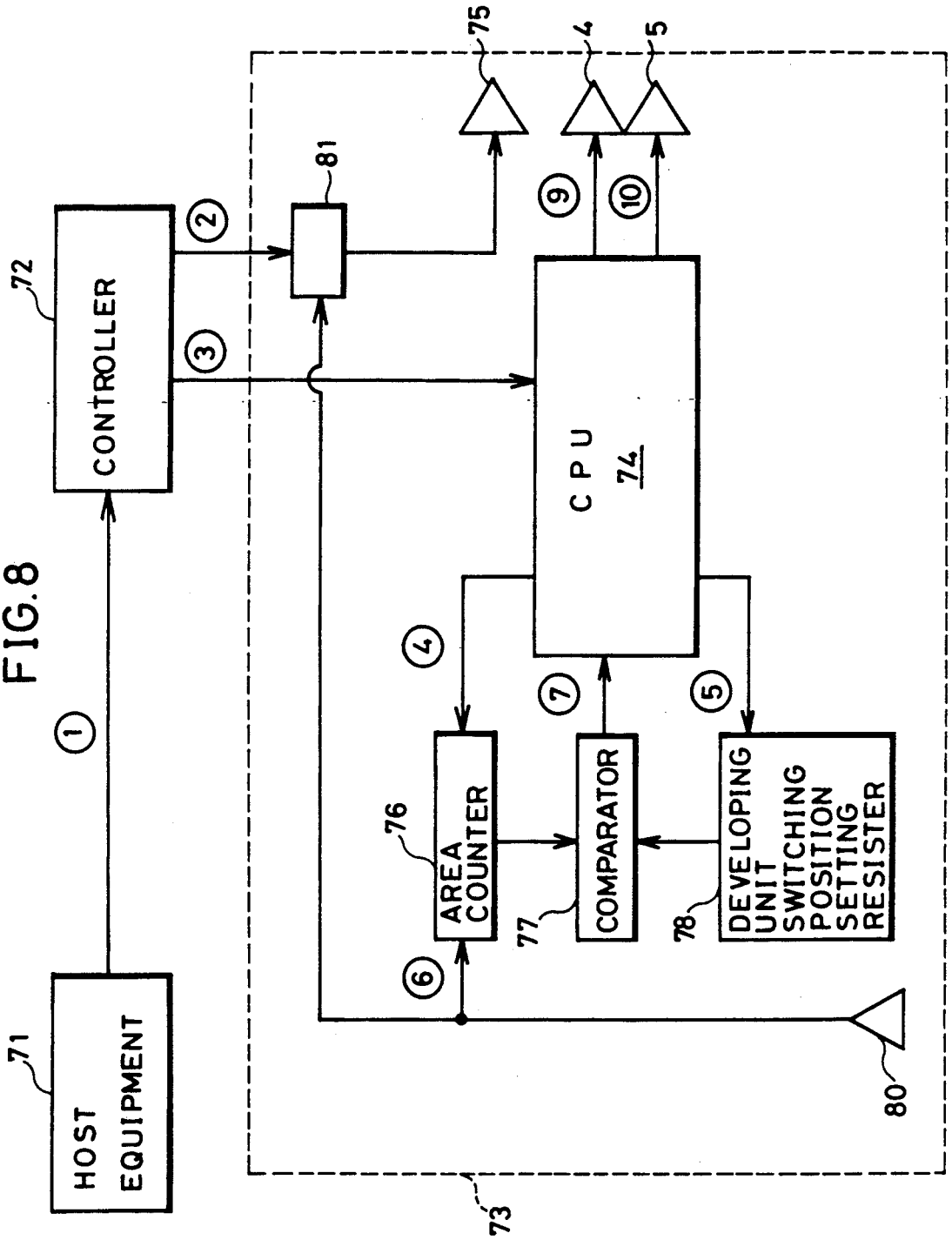
FIG. 8 is a block diagram showing data exchange between a host machine, a controller and a printer engine 73.

FIG. 8 is a block diagram showing the exchange of image data and information for controlling the developing units between each of a printer engine 73 controlling the printer on which the present invention is applied, the host machine 71 and the controller 72.

The print data transmitted from the host machine 71 through a bus 1 comprise image data and the information for controlling the developing units. Receiving the print data, the controller 72 forms an actual printing image (bit map) from the image data and the data to be inputted to the bit map are transmitted to the printer engine 73 through a bus 2 and the gate 81 so that they are in synchronization with the rotary pulses of the photoreceptor drum detected by the photoreceptor drum rotation detecting encoder 80. The information for controlling the developing units are transmitted to the printer engine 73 through a bus 3. The CPU 74 of the printer engine 73 which received respective information through the buses 2 and 3 drives the printer based on the information, and controls the switching between the first and second developing units 4 and 5 through the buses 9 and 10, the turning ON/OFF an emitter (laser) 75, and so on. The CPU 74 stores the pulses detected by the photoreceptor drum rotation detecting encoder 80 through a bus 6 in a print area counter 76. The CPU 74 is connected to the print area counter 76 by a bus 4. The CPU 74 controls the activation and resetting of the operation of the print area counter 76. Further, the CPU 74 is connected to a developing unit switching position setting register 78 through a bus 5. The CPU 74 transmits count signals from the print area counter 76 and designating signals designating positions for switching from the developing unit switching position setting register 78 to a comparator 77. The comparator 77 compares both signals and when the signals coincide with each other, it generates an interruption in the CPU 74 through a bus 7. Consequently, the switching of the developing units can be controlled by the pulses detected by the photoreceptor drum rotation detecting encoder 80.

A rotation detecting encoder of a servo motor for driving the photoreceptor drum may be used as the above described encoder 80.

Figure 9:
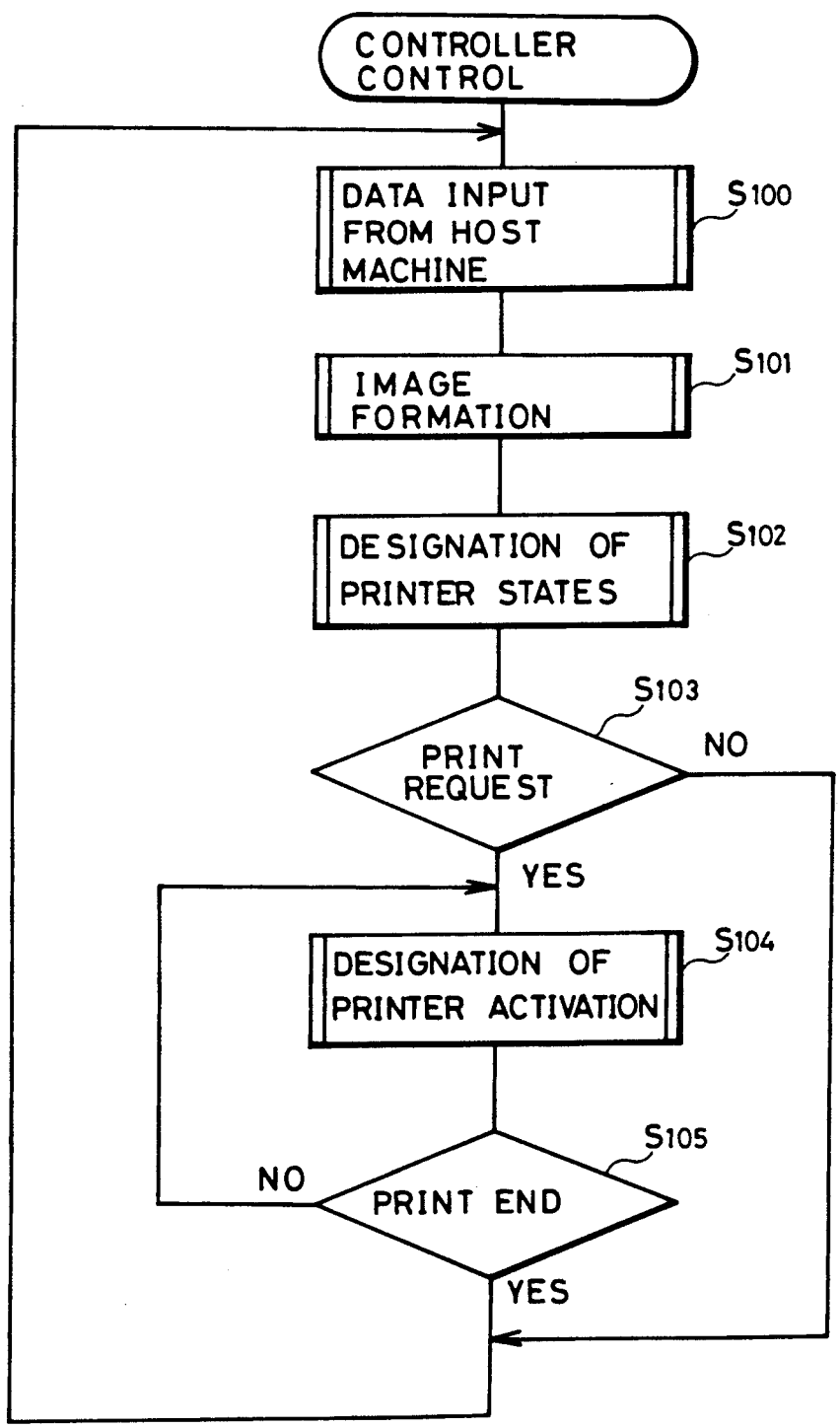
FIG. 9 is a flow chart showing a main routine of the control of the controller.

FIG. 9 is a flow chart showing a main routine of the control of the controller 72. A data input routine is carried out in the step S100 (the term step will be omitted in the following), where the image data and the control data for the printer from the host machine 71 are inputted. In S101, an image forming routine is carried out, in which the image data are inputted to an image buffer. In S102, a routine for designating various states of the printer is carried out, in which the control data for the printer are processed. The control data comprises data for selecting the developing units, designating the simultaneous color printing, the data in association with the switching timing of the developing units to provide the simultaneous color printing, the instructing data for selecting the paper feed inlets, setting various function modes, and so on. This routine will be described in detail in the following. Thereafter, in S103 whether there is a print request from the host machine or not is determined and if there is a request (YES in S103), a command for actually activating the printer is outputted (S104). In that case, the controller 72 enters a mode for outputting image data. Once started, normally the print mode is maintained until the end of printing (S105) and the flow returns to the ordinary loop at the end of printing.

Figure 10:
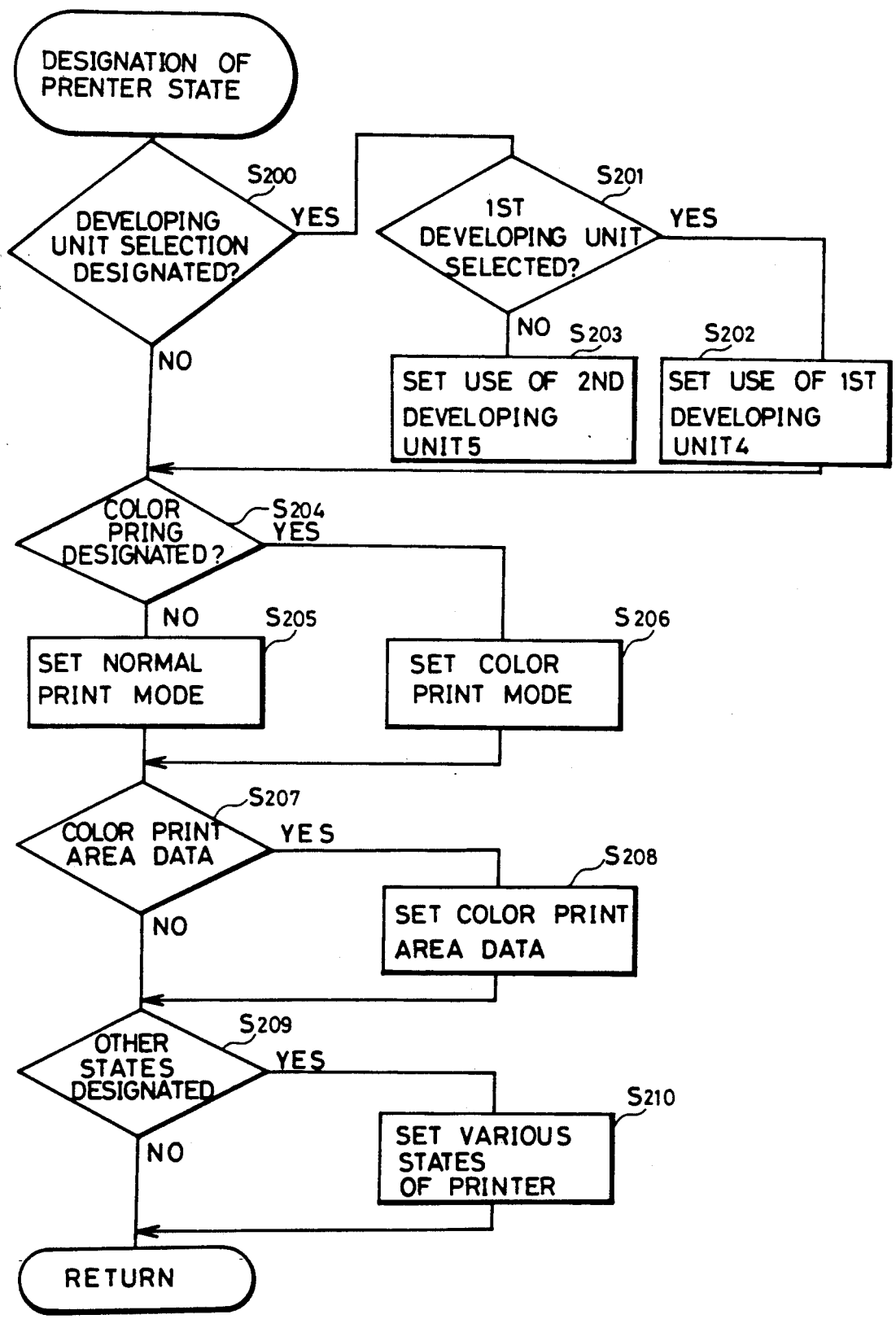
FIG. 10 is a flow chart showing a routine for designating various states of the printer.

FIG. 10 is a flow chart showing the routine for designating various states of the printer.

As described above, various states of the printer such as selection of paper feed inlets, setting of the modes of various additional functions and so on are designated. However, the selection of the developing units, the designating of the simultaneous color printing and the designation of the simultaneous color printing area are described in the present routine so as to make clear the execution of the simultaneous color printing mode.

First, in S200, whether the selection of the developing units is designated or not is checked. If it is YES, whether the first developing unit is selected or not is checked in S201 and if so, the use of the first developing unit is set in S202. Otherwise, the use of the second developing unit is set in S203. Thereafter, whether the simultaneous color printing is designated or not is checked in S204. If it is not designated (NO in S204), a normal print mode is set in S205. The normal print mode means a mode of printing in which one entire page is developed by the selected developing unit. When the simultaneous color printing is designated in S204, then the simultaneous color printing mode is designated in S206. The flow proceeds to S207 to determine whether the simultaneous color printing area data is designated or not. If it is YES, the simultaneous color printing area data are set in S208, thereafter other states of the printer are checked in S209, and various states are set for the printer in accordance with the designation (S210). The various states for the printer may be set by setting data in a RAM area which can be commonly accessed for the printer and for the printer engine, or they may be set by a plating data when needed by serious communication.

Figure 11A:
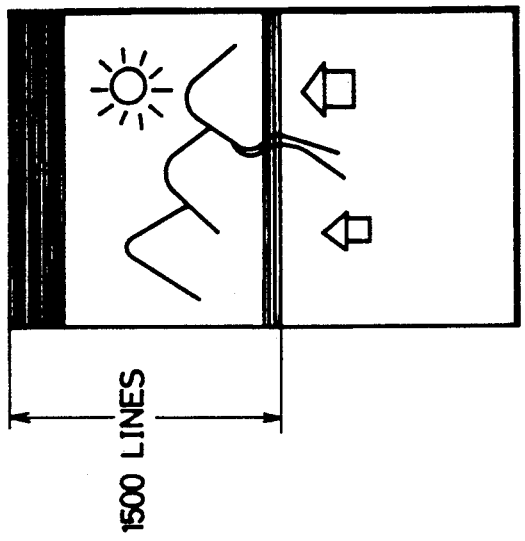
FIGS. 11A, 11B and 11C illustrate a manner for forming digital data, respectively.
Figure 11B:
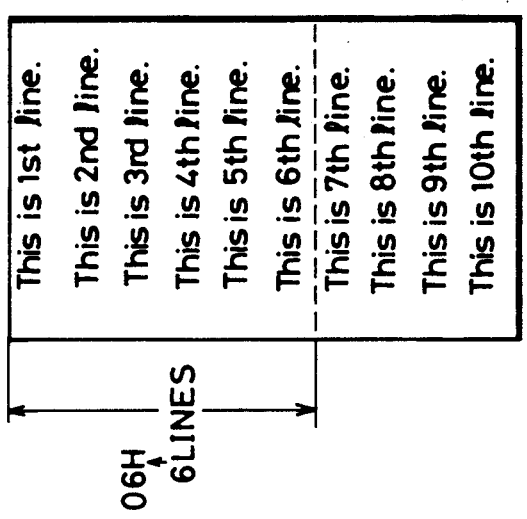
Figure 11C:
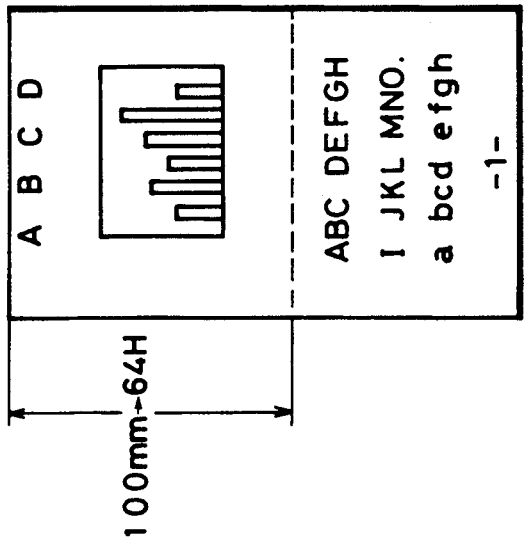

The setting of the simultaneous color printing area data is carried out in the following manner. Namely, the distance from the edge of a paper is represented by the unit of "mm", which is converted into hexadecimal data suitable for the interface of the printer engine as the state designating data to the printer. For example, when the developing unit must be changed at a position spaced by 100 mm from the edge of the paper as shown in FIG. 11A, the hexadecimal data of 64H is treated as the printer state designating data. The number of lines from the edge of the paper or the roster number may be used for setting the simultaneous color copying area data, as shown in FIGS. 11B and 11C.

Figure 12:
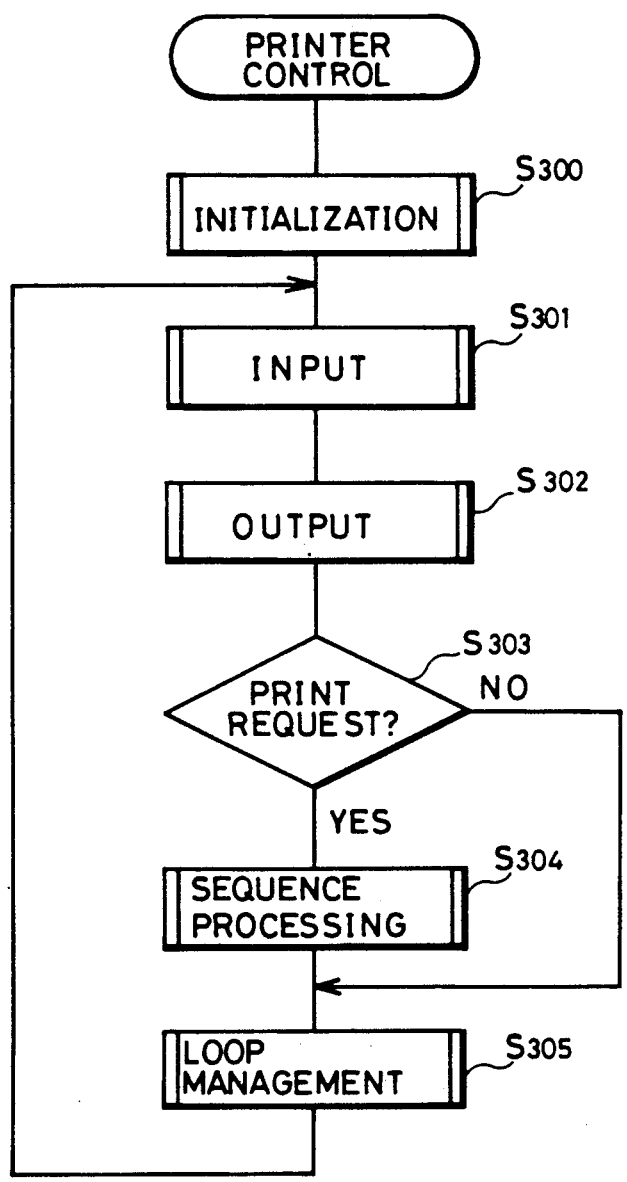
FIG. 12 a flow chart of a main routine for controlling the printer engine.

FIG. 12 shows a flow of a main routine for controlling the printer engine. In S300, the printer engine is initialized. Then the flow enters a main loop. The input processing routine and the output processing routine are carried out in S301 and S302, respectively. In S303, the presence/absence of a print command from the controller is checked. If there is the print command, the flow proceeds to S304 to carry out a sequence processing routine, a loop management routine (for managing the time required for the loop and so on) is carried out in S305, and the flow returns to the input processing routine of S301. If there is no print command in S303, the loop management routine of S305 is executed and the flow returns to the input processing routine of S301.

Figure 13:
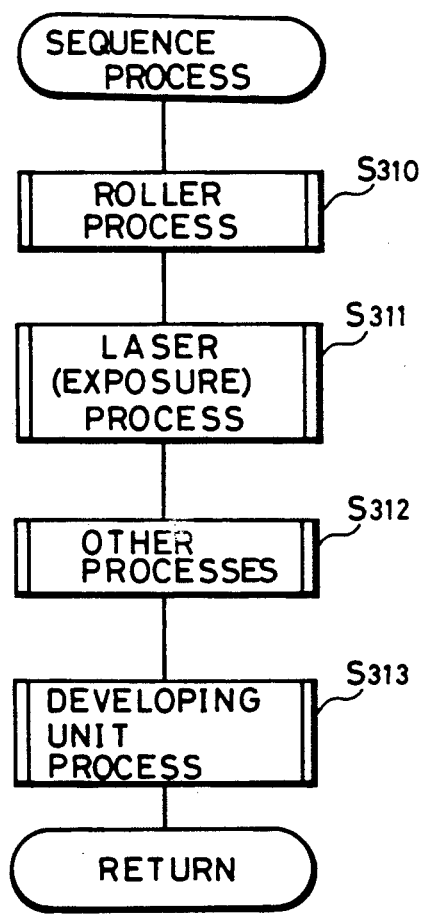
FIG. 13 is a flow chart of a sequence processing routine.

FIG. 13 is a flow chart showing the contents of the sequence processing routine (S304). A roller processing routine is carried in S310 in which the paper feed rollers are controlled to feed and discharge papers. In S311, a laser (exposure) processing routine is carried out in which the ON/OFF state of the laser is controlled. In S312, other process routines are carried out, for example, the processes for an accident and so on are carried out. Thereafter, in S313, the developing unit processing routine is carried out in which the switching of the developing units in the simultaneous color printing mode is carried out.

The setting and control of the terming for switching the developing units in the simultaneous color printing mode is carried out in the laser (exposure) processing routine of S311 shown in FIG. 13, and the actual switching is carried out in the developing unit processing routine of S313.

Figure 14:
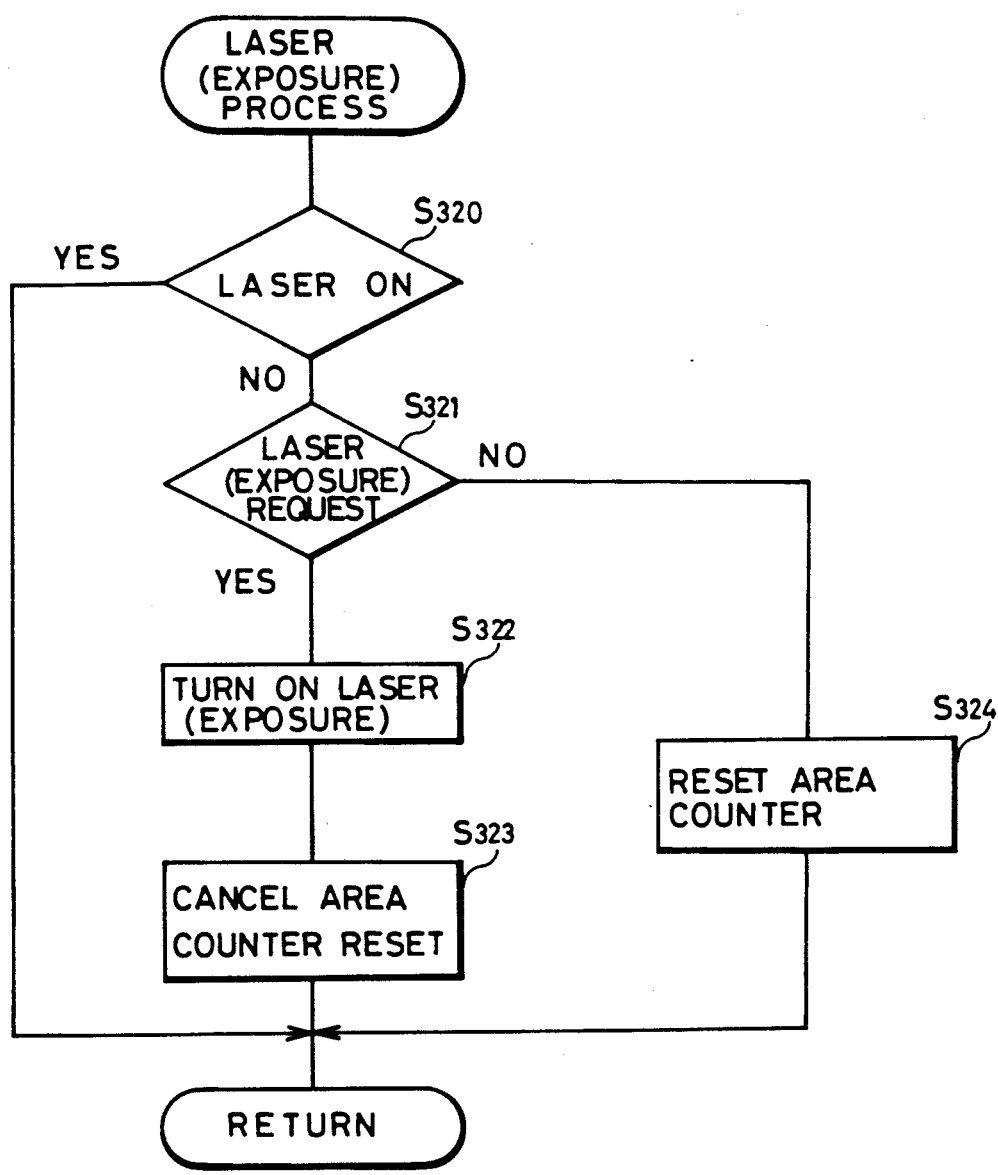
FIG. 14 is a flow chart of a laser (exposure) processing routine.

FIG. 14 is a flow chart showing the contents of the laser (exposure) processing routine.

The printer engine 73 which received the print command from the controller 72 enters the sequence processing as described above. First, as shown in S320 of FIG. 14, the ON/OFF state of the laser is checked. Now, the laser is initially OFF in this case, the presence/absence of a request for turning the laser ON (exposure) is checked in S321 and if there is a request, the laser is turned ON (S322), the reset of the print area counter 76 is released (S323) and the pulses directed by the photoreceptor drum rotation detecting encoder 80 is counted. It is assumed that the print area counter has been reset in the initializing routine of S300 (FIG. 12). When the flow returns to the sequence processing routine after one circulation of the main loop, it is determined that the laser is ON in the step of checking the ON/Off of the laser (S320), so that the flow directly returns to the step S312 of the sequence processing routine.

Figure 15B:
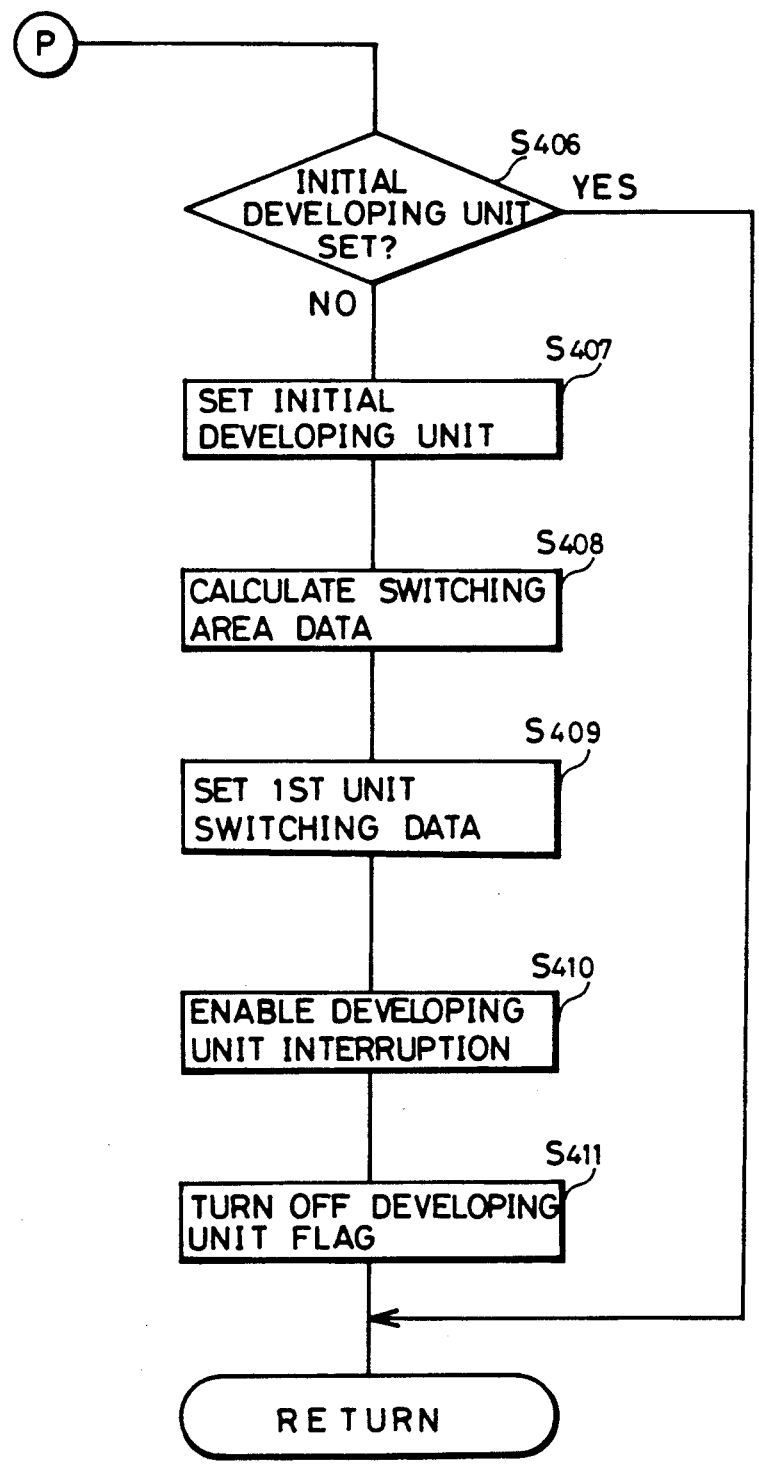
FIG. 15 is a flow chart of a developing unit processing routine.

FIG. 15 is a flow chart showing the details of the developing unit processing routine of S313.

First, whether the operation is in the simultaneous color printing mode or not is checked in S400. If it is in the normal print mode and not in the simultaneous color printing mode, either one of the two developing units is selectively driven in accordance with the steps S401 to 405 and one entire page is printed in one color. Namely, when the first developing unit is selected in S401, the second developing unit is turned OFF in S402, and the first developing unit is turned ON (S403). If the second developing unit is selected, the first developing unit is turned OFF (S404), and the second developing unit is turned ON (S405).

If it is in the simultaneous color printing mode in S400, the flow proceeds to S406 to determine whether the initial developing unit for the simultaneous color copying mode is set or not. If it is not set, the initial developing unit is set in S407. In the setting of the initial developing unit, whether the first developing unit or the second developing unit should be employed for developing the first half of one page is determined, and the timing of turning ON/OFF respective units is selected in accordance with the determination.

Thereafter, in S408, the data for switching the developing units is calculated in accordance with the following equation, using the simultaneous color printing area data, the rotation angle $\alpha$ from the exposure position W to the first developing unit and the rotation angle $\beta$ to the second developing unit from the controller 72.

Equation $$A = Nd//+N\alpha/2\pi \quad (i)$$

$$B = A + N\beta/2\pi \quad (ii)$$

where
A: first developing unit switching position(pulse number)
B: second developing unit switching position(pulse number)
N: encoder pulse number per 1 rotation of the photoreceptor drum
d: developing unit changing area data (e.g. mm) from the controller
/: peripheral length of the photoreceptor drum (mm)

The data A of the first developing unit switching position calculated in accordance with the above equation (i) is set in the developing unit switching setting register 78 in S409, the developing unit interrupting process is enabled in S410 and the developing unit flag is set OFF to indicate that the developing unit switching data set in the step S409 are for the first developing unit (S411).

Thus the initialization for switching developing units is completed, and the flow returns to the sequence processing routine. Since the initialization is completed when the flow again proceeds to the developing unit processing routine after one circulation of the printer control routine (S406) no process is carried out in the program routine shown in FIG. 15 and the flow returns to the sequence processing routine.

Figure 16A:
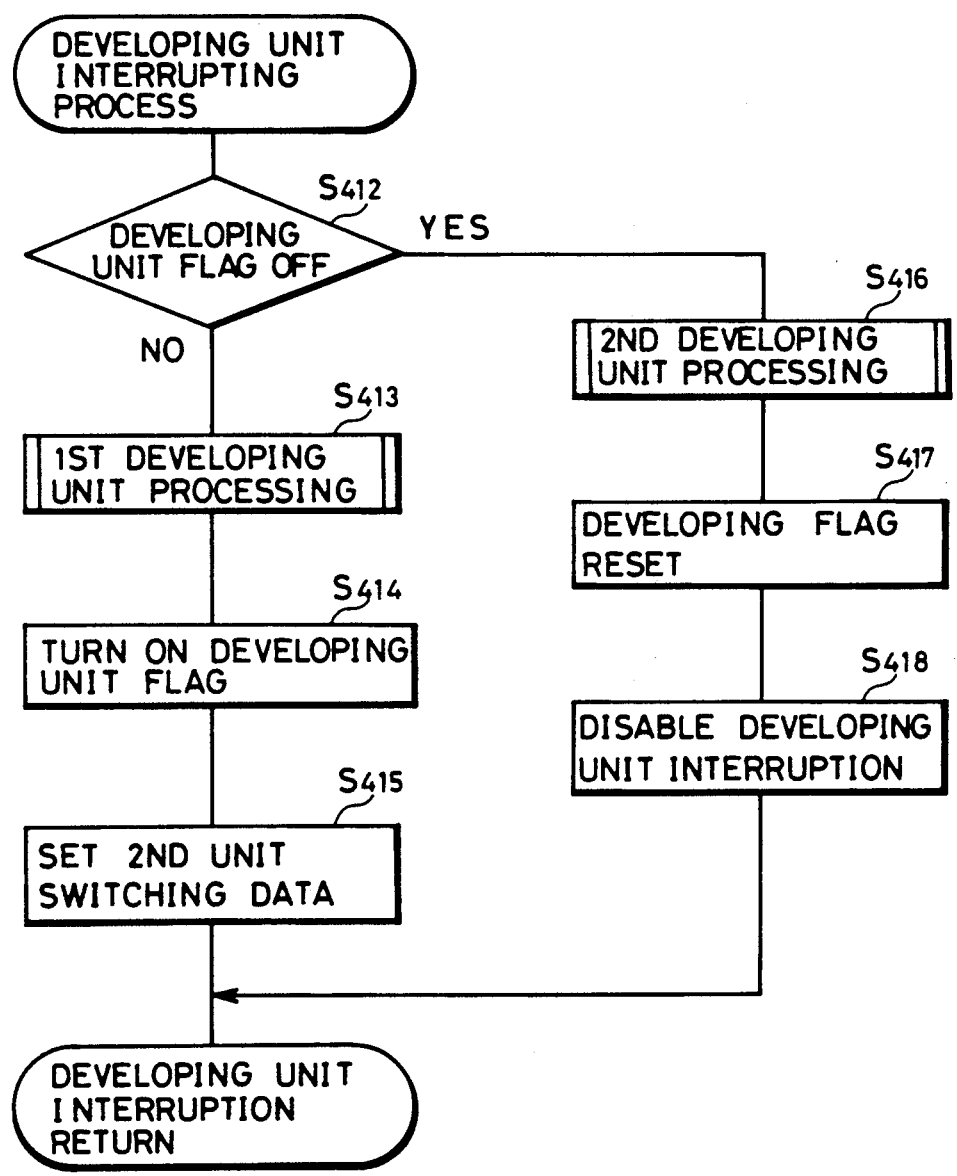
FIG. 16A is a flow chart of a developing unit interrupting process routine.

Thereafter, when the counter signal from the print area counter 76 shown in FIG. 8 coincides with the first developing unit switching position data set in the developing unit switching position setting register 78 in S409, the comparator 77 generates an interruption to the CPU 74, and the CPU 74 enters a developing unit interrupting process routine shown by the flow chart of FIG. 16A.

In the developing unit interrupting process routine, first, the ON/OFF of the developing unit flag which is reset in the step S411 of the above described developing unit processing routine is checked in S412. If this flag is reset (NO in S412), then the first developing unit process routine (FIG. 16B) is called in the step S413. In the first developing unit process routine, whether the first developing unit is selected or not at present is checked in S419. If it is selected, the first developing unit is turned OFF (S421), if it is not selected, it is turned ON (S420), and the flow returns to the step S414 in the developing unit interrupting process routine. In S414, the developing unit flag is set ON to indicate that the next interrupting process is the switching of the second developing unit. The second developing unit switching position data B calculated in accordance with the equation (ii) in the step S408 in the above described developing process routine is set in the developing unit switching position setting register 78 in S415, and the flow returns from the developing unit interrupting process routine to the normal program routine.

When the process further proceeds and when it is detected that the count signal from the print area counter 76 shown in FIG. 8 coincides with the data in the developing unit switching position setting register 78 in which the switching position of the second developing unit is set, the comparator 77 again generates an interruption to the CPU 74, and the flow again enters the developing unit interrupting process routine of FIG. 16A.

In the developing unit interrupting process routine, the ON/OFF of the developing unit flag is checked in S412 in the similar manner as described above. Since the developing unit flag is turned ON in the previous interrupting process (S414), the second developing unit process routine (FIG. 16C) of S422 is called.

Figure 16B:
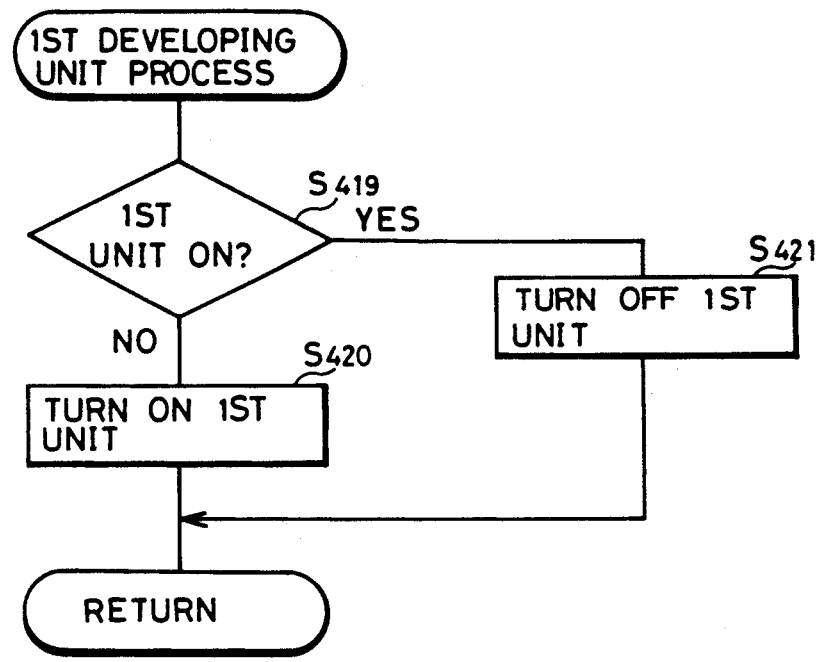
FIG. 16B is a flow chart of a first developing unit processing routine.
Figure 16C:
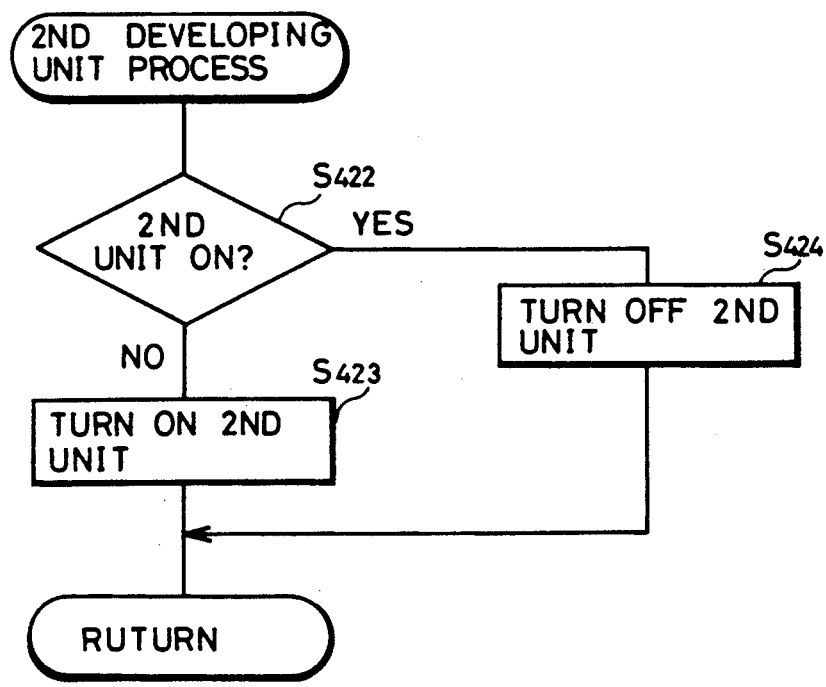
FIG. 16C is a flow chart showing a second developing unit processing routine.

In the second developing unit process routine, whether the second developing unit is selected or not is checked in S422 in the similar manner as in the first developing unit process routine (FIG. 16B). If it is selected (ON state), it is turned OFF (S424). If it is not selected (OFF state), it is turned ON in S423, and the flow returns to the step S417 in the interrupting process routine. In S417, the developing unit flag is reset, the developing unit interruption is disabled in S418, and the flow returns to the normal program routine. The developing unit process is initialized in the said steps S417 and S418 to be ready for the next request for printing.

The developing unit switching process is carried out in the above described manner by using the photoreceptor drum rotation detecting encoder. Such interrupting process enables changing of the developing units with higher precision.

The equations (i) and (ii) are applied when the changing area data from the host is based on the data of the distance from the edge of the paper. The same process of switching the developing units can be carried out by inputting the following values in the term d of the equation (i) when the switching area data is the number of lines or the roster number from the edge of the paper.

When the data is the line number $$d = d_l \times n_l$$

where
$d_l$: width of 1 line (mm)
$n_l$: number of lines when the data is roster number $$d = d_r \times n_r$$

where
$d_r$: width of 1 roster (mm)
$n_r$: roster number

In this embodiment, the developing unit switching control is carried out by interruption with the counter for counting encoder pulses of the photoreceptor drum rotation detecting encoder, the register for setting the developing unit switching position, the comparator for detecting the developing unit switching position and for generating interruption arranged out of the body of the printer. The control may be carried out by an internal interruption of the CPU by using an event counter in the CPU.

Although simultaneous printing of two colors is realized by selectively switching and driving two developing units in the present embodiment, the simultaneous multicolor printing may be realized by selectively switching and driving three or more developing units.

As is apparent from the above described structure and the embodiment of the present invention, the setting of the switching timing for selectively switching and driving a plurality of developing units having developers of different colors is controlled by counting pulse signals from a encoder detecting the amount of rotation of the photoreceptor drum. Different from the conventional method in which the moving amount on the outer periphery of the photoreceptor drum from the exposure position to the developing position is controlled by the time set in a timer, the method of the present invention enables a closed loop control corresponding to the actual velocity of rotation of the photoreceptor drum. Therefore, even if the process speed is changed, there is no need of changing the time constant of the timer or the like.

According to a preferred embodiment of the present invention, the counter for counting encoder pulses, the register for setting the developing unit switching position, and the comparator for detecting the developing unit switching position and generating interruption are provided out of the body of the printer, and the setting of said switching timing is controlled by an interruption process. Therefore, the position for switching the developing units can be surely carried out with high precision. When an encoder of a servo motor for driving the photoreceptor drum is used as the encoder, more precise amount of rotation can be detected. An event counter in the central processing unit (CPU) may be used instead of external apparatuses. In that case, the setting of the switching timing of the developing units can be controlled by an internal interruption process of the CPU.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printer for forming a printed image on a recording medium on the basis of data received from a host control unit, said printer comprising:
   a photoreceptor member;
   latent electrostatic image forming means provided opposed to said photoreceptor member for forming a latent electrostatic image on an outer periphery of said photoreceptor member;
   first developing means provided opposed to said photoreceptor member in the downstream side of said latent electrostatic image forming means for developing a portion of said latent electrostatic image with toner of a first color;
   second developing means provided in the downstream side of said first developing means for developing another portion of said latent electrostatic image with toner of a second color which is different from said first color;
   pulse generating means associated with said photoreceptor member for generating pulses corresponding to an amount of rotation of said photoreceptor member;
   counting means for counting said pulses, said counting means being adapted to start counting after start of formation of said latent electrostatic image;
   setting means for setting a prescribed value based on the data received from the host control unit, said data representing a border line between the portions developed by the first developing means and developed by the second developing means;
   switching signal generating means for generating a signal to switch operation of said first and second developing means, said switching signal generating means being adapted to output said switching signal when a value counted by said counting means reaches said prescribed value set by setting means; and
   control means responsive to said switching signal for controlling the operation of said first and second developing means.

2. A printer according to claim 1, wherein
   said switching signal generating means generates a first signal for stopping the operation of said first developing means and a second signal for operating said second developing means.

3. A printer according to claim 1, wherein
   said pulse generating means comprises an encoder.

4. A printer according to claim 3, wherein
   said photoreceptor member is driven by a servo motor; and
   said encoder is attached to an output axis of said servo motor.

5. A printer according to claim 1, wherein
   said switching signal generating means further comprises:
   first memory means for storing said prescribed value, and
   second memory means for storing said counted value.

6. A printer according to claim 5, wherein
   said switching signal generating means comprises means for comparing said prescribed value with said counted value.

7. A printer according to claim 1, wherein said data received from the host computer unit includes image data and control data to select the developing means for developing the latent electrostatic image.

8. A printer, comprising:
   a photoreceptor member;
   latent electrostatic image forming means for forming a latent electrostatic image on a peripheral surface of said photoreceptor member;
   first developing means provided opposed to said photoreceptor member for developing a portion of said latent electrostatic image with toner of a first color;
   second developing means for developing another portion of said latent electrostatic image with toner of a second color different from said first color;
   transfer means provided opposed to said photoreceptor member for transferring said developed image onto a recording paper;
   paper feeding means for feeding said recording paper between said photoreceptor drum and said transfer means, at least said latent electrostatic forming means and said paper feeding means driven by a prescribed first driving timing;

first control means for controlling said driving timing by means of a timer;

first generating means connected to said photoreceptor member for generating pulses corresponding to an amount of rotation of said photoreceptor member, said first and second developing means driven by a prescribed second driving timing; and second control means for controlling said second driving timing so that the developing operation is switched from said first developing means to said second developing means corresponding to said pulses.

9. A printer for forming a printed image on a recording medium on the basis of data received from a host control unit, said printer comprising:

a photosensitive member;

charging means for charging the peripheral surface of the photosensitive member;

a laser beam radiating unit including a radiant element for radiating a laser beam and a scanning means for scanning the laser beam on the photosensitive member;

modulating means for modulating the laser beam radiated from said radiant element in accordance with the data received from the host control unit;

first developing means provided opposed to said photosensitive member in the downstream side of said latent electrostatic image forming means for developing a portion of said latent electrostatic image with toner of a first color;

second developing means provided in the downstream side of said first developing means for developing another portion of said latent electrostatic image with toner of a second color which is different from said first color;

pulse generating means associated with said photosensitive member for generating pulses corresponding to an amount of rotation of said photosensitive member;

synchronizing means for synchronizing the modulation of the laser beam with the pulse generated from said pulse generating means;

counting means for counting said pulses, said counting means being adapted to start counting after start of modulation of said modulating means;

setting means for setting a prescribed value based on the data received from the host control unit, said data representing a border line between the portions developed by the first developing means and developed by the second developing means; and switching means for generating switching operation of said first and second developing means when a value counted by said counting means reaches said prescribed value set by setting means.

10. A printer according to claim 9, wherein said pulse generating means includes an encoder provided on an axis of said photosensitive member.

11. A printer according to claim 9, wherein said switching means includes means for comparing said prescribed value with said counted value.

* * * * *

UNITED STATES PATENT AND TRADEMARK OFFICE
CERTIFICATE OF CORRECTION

PATENT NO. : 5,025,323

DATED : June 18, 1991

INVENTOR(S) : Kiyoshi EMORI, et al.

It is certified that error appears in the above-identified patent and that said Letters Patent is hereby corrected as shown below:

On the title page, item [54]:

The title of the invention is corrected to read:

--DEVELOPING UNIT SWITCHING DEVICE FOR A PRINTER--

Signed and Sealed this

Sixth Day of October, 1992

Attest:

DOUGLAS B. COMER

*Attesting Officer*    *Acting Commissioner of Patents and Trademarks*